(12) United States Patent
Wong

(10) Patent No.: US 7,527,729 B2
(45) Date of Patent: May 5, 2009

(54) AQUARIUM

(76) Inventor: Tommy Chi-Kin Wong, Unit 16-18, 5/F, Pacific Trade Centre, 2 Kai Hing Rd., Kowloon Bay (HK)

( * ) Notice: Subject to any disclaimer, the term of this patent is extended or adjusted under 35 U.S.C. 154(b) by 214 days.

(21) Appl. No.: 11/582,433

(22) Filed: Oct. 18, 2006

(65) Prior Publication Data

US 2007/0251866 A1    Nov. 1, 2007

(30) Foreign Application Priority Data

Apr. 27, 2006    (CN) .................... 2006 1 0060505

(51) Int. Cl.
 *A01K 63/04*    (2006.01)
(52) U.S. Cl. .................... 210/167.23; 210/416.2; 119/259
(58) Field of Classification Search ............ 210/167.21, 210/167.23, 416.1, 416.2; 119/259, 267, 119/269
See application file for complete search history.

(56) References Cited

U.S. PATENT DOCUMENTS 3,247,826 A * 4/1966 Girard ..................... 119/259
3,512,646 A * 5/1970 Willinger ................ 210/167.21
3,563,204 A * 2/1971 Szilagyi .................... 119/267
3,687,291 A * 8/1972 Willinger ................ 210/167.23
3,688,907 A * 9/1972 Oravec .................. 210/167.26
4,687,575 A * 8/1987 Grose ..................... 210/167.22
4,817,561 A * 4/1989 Byrne et al. .............. 119/260
6,041,740 A * 3/2000 Newman ................... 119/261

FOREIGN PATENT DOCUMENTS

| JP | 6-285310 | * 10/1994 |
| JP | 2000-79306 | * 3/2000 |
| JP | 2000-93714 | * 4/2000 |
| JP | 2004-290016 | * 10/2004 |

\* cited by examiner

*Primary Examiner*—Fred Prince
(74) *Attorney, Agent, or Firm*—Rabin & Berdo, P.C.

(57) ABSTRACT

The invention relates to an aquarium comprising a water tank and a sieve that is arranged in the water tank; the sieve comprises a filter and a driving mechanism supplying power to the filter. The filter is disposed in the internal part of a container of the water tank, while the driving mechanism is disposed outside the container of the water tank. Consequently, the invention can effectively allow the power source of a conducting wire of the sieve of the aquarium to avoid getting into the container of the water tank; in addition, it can eliminate the possibility of electric leakage of said conducting wire underwater in the container of the water tank.

10 Claims, 13 Drawing Sheets

AQUARIUM

BACKGROUND OF THE INVENTION

I. Field of the Invention

The present invention refers to an aquarium, especially to a fish tank that applies a sieve to achieve tank cleaning and water purification.

II. Description of the Prior Art

With improvements in people's living conditions, embellishments or adornments of a house and/or a public place has been causing more and more concerns to the general public; for example, an aquarium can become an adornment to a space. Nowadays, an aquarium is used to display aquatic creatures, such as goldfish; therefore, an aquarium is usually equipped with a sieve therein to achieve the objectives of clarifying water in the tank and creating a favorable living environment for aquatic creatures.

Nevertheless, most conventional aquariums have the same drawbacks of hidden dangers to people who love fish and aquatic creatures and/or are unsightly while the aquarium tank is under water purification. Specifically, as shown in FIG. 16, an aquarium 70 has a sieve 71 entirely placed under water in a water tank 72 thereof. Once there is a leakage of electricity under water resulting from the electric connection of a conducting wire 711 of the sieve 71, this may cause the death of aquatic creatures therein, and is a hidden danger to a human's life as well. In addition, said conducting wire 711 is usually exposed to be accessible to people, so it can easily cause the danger of electric leakage to people. Furthermore, the conducting wire 711 is exposed outside the water tank 72, which makes for an unsightly appearance for the aquarium 70.

Another aquarium 80 as shown in FIG. 17 has a sieve 81 entirely disposed outside a water tank 82; the sieve 81 is connected to the water tank 82 through a water-inlet tube 811 and a drain pipe 812. The installation of both the water-inlet tube 811 and the drain pipe 812 results in a poor appearance of the aquarium 80; likewise, the electric wire connection of a conducting wire 813 of the sieve 81 is on the lateral side of the water tank 82, thereby enabling said conducting wire 813 to be exposed to people, resulting in a hidden danger of electric leakage to anyone nearby. Moreover, in the event that the drain pipe 812 accidentally comes off outside the tank resulting in outwards-flowing water, such an incident may cause death of aquatic creatures in the tank and cause damage to household articles.

Another conventional aquarium 90 as shown in FIG. 18 has a similar structure to the aquarium 80 as shown in FIG. 17. Said aquarium 90 has a sieve 91 fastened on top of the lateral wall of a water tank 92 thereof through a hook 911. Likewise, the installation of both the hook 911 and a water-inlet tube 912 makes a poor appearance for the aquarium 90; meanwhile, the electric connection of a conducting wire 913 of the sieve 91 is on a lateral side of the water tank 92 so that the possibility of electric leakage may cause death of aquatic creatures in the tank or cause damage to surrounding people once the sieve is dropped into the tank.

To solve the foregoing drawbacks of said conventional aquariums (fish tank structures), the invention is disclosed hereafter.

SUMMARY OF THE INVENTION

The main objective of the present invention is to provide an aquarium that is able to effectively prevent a conducting wire of a sieve in the aquarium from getting into the water tank, so as to eliminate the possibility of electric leakage of said conducting wire underwater in the water tank and to enhance the appearance of the aquarium.

To achieve said objectives, the aquarium of the invention comprises a water tank and a sieve that is disposed in the water tank. The sieve comprises a filter and a driving mechanism for supplying power to the filter. The characteristic of the invention lies in that the filter is arranged in the internal part of a container in the water tank, while the driving mechanism is disposed outside said container of the water tank.

The filter of the invention has a magnetic movable member, while the driving mechanism is a device for generating magnetism and transforming the magnetic pole.

The magnetic movable member is a rotary axle or an impeller.

Generally, the water tank is a transparent container.

The water tank has a columnar body arranged on the wall thereof and extended inwards toward the inner part of the container; the columnar body has a magnetic rotary axle disposed therein and is enclosed by the driving mechanism. The driving mechanism is a silicon steel with a coil winding around or a magnetic device for transforming the magnetic pole; the magnetic rotary axle is driven to rotate by the driving mechanism that is disposed outside the container.

The water tank has a columnar body arranged on the wall thereof and extended outside the container; the columnar body is able to be enclosed by a magnetic impeller; the columnar body has the driving mechanism arranged therein; the driving mechanism is an electric machinery having a rotary axle disposed on the top of a rotor thereof; the magnetic impeller is driven to rotate by the rotary axle on top of the electric machinery.

The water tank has a device with a magnetic slice disposed on the wall thereof; the container has the driving mechanism arranged outside thereof; the driving mechanism is a device for transforming the magnetic pole, the magnetic slice is driven to move up and down due to the intermittent magnetism generated by the driving mechanism.

The columnar body that is arranged on the wall of the water tank extended inwards or outwards from the container and the water tank are both made in one piece.

A diverter is installed on the magnetic impeller, comprising a water inlet and a water discharge disposed thereon.

A diverter is installed on the magnetic impeller of the rotor, comprising a water inlet and a water discharge disposed thereon.

A diverter is installed on the magnetic slice, comprising a water inlet and a water discharge disposed thereon.

Said water inlet and said water discharge of the diverters connect the sieve containing filter material therein and an apparatus for the diversion of water flow.

The water tank has a hollow portion on the wall thereof extended inwards, enabling a lighting component or a heater to be installed therein.

The water tank has an interface arranged on the wall thereof for connecting ornaments.

Differing from conventional aquarium structures, the aquarium of the invention has the filter thereof disposed in the internal part of the container of the water tank, while the driving mechanism is disposed outside the container of the water tank. Consequently, the invention is able to effectively avoid the power source of a conducting wire of the sieve of the aquarium from getting into the container of the water tank; in addition, eliminate the possibility of electric leakage of said conducting wire underwater in the container of the water tank. Moreover, the conducting wire is placed in a place not easily accessed by people to ensure human safety. At the same time, it provides the necessary power supply for other electric components and other power related components are well arranged to enhance the overall appearance of an aquarium.

DESCRIPTION OF THE PREFERRED EMBODIMENT

Further aspects, objects, and desirable features of the invention will be better understood from the detailed description and drawings that follow in which various embodiments of the disclosed invention are illustrated by way of example.

Figure 1:
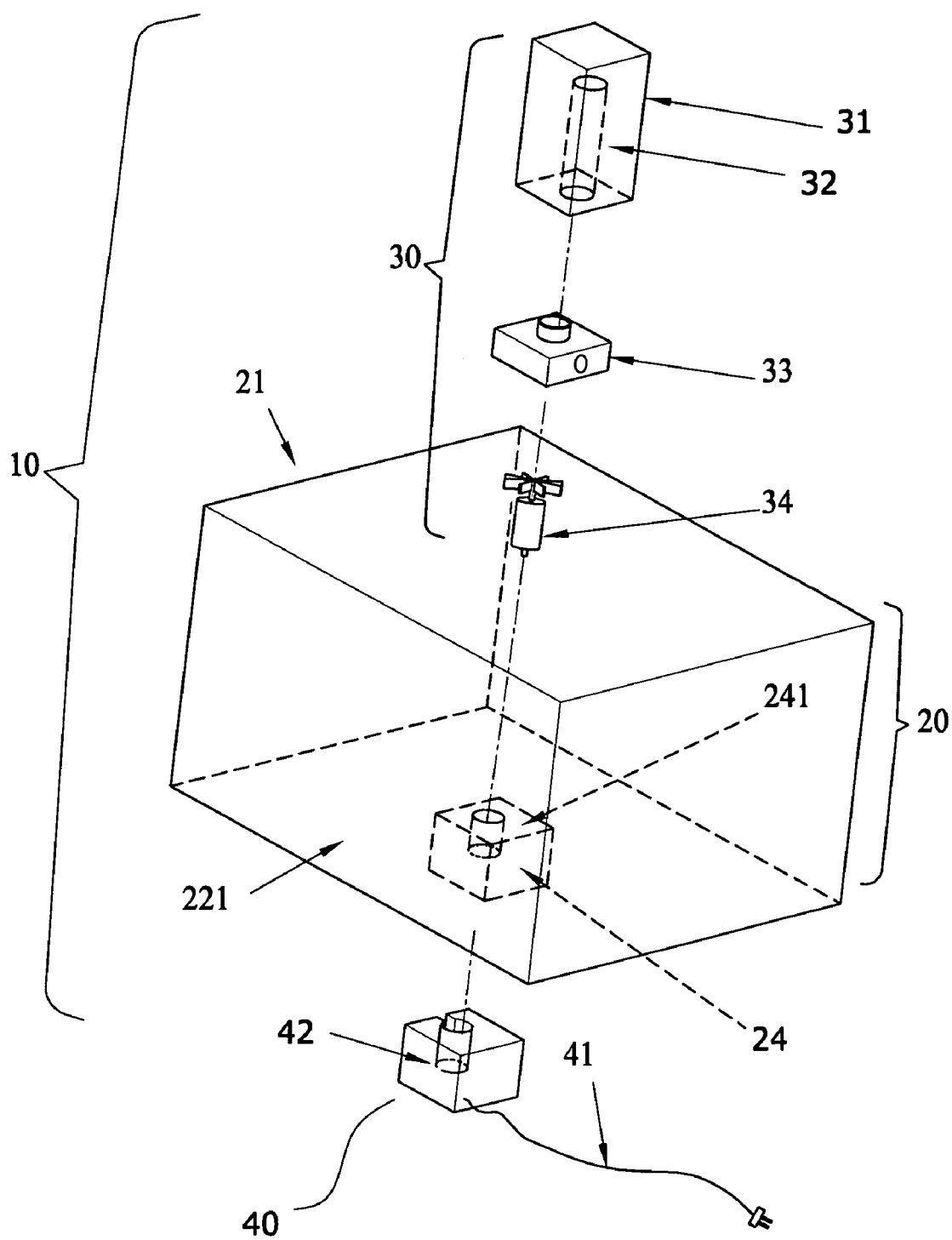
FIG. 1 is a three-dimensional perspective view showing a preferred embodiment of an aquarium of the invention.

With reference to FIG. 1, the aquarium of the invention 10 comprises a water tank 20 and a sieve arranged in the water tank. The sieve comprises a filter 30 and a driving mechanism 40 supplying power to the filter 30. The filter 30 is disposed in the inner part of a container (water containing portion) 21 of the water tank 20. The driving mechanism 40 is disposed outside the container 21 of the water tank 20. Therefore, a conducting wire 41 of the driving mechanism 40 is not necessarily placed in the inner part of the container 21 of the water tank 20 without being easily accessed by people, so as to avoid the incidents of electric leakage of the conducting wire 41. Meanwhile, the conducting wire 41 is disposed outside the container 21 of the water tank 20 for providing the necessary power supply for other power related components. In addition, the water tank 20 can be made of transparent material for easy observation from the outside.

Figure 2:
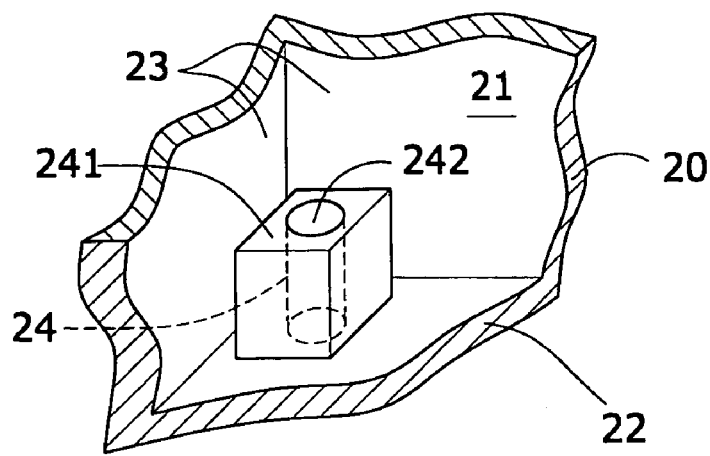
FIG. 2 is a partial three-dimensional perspective view showing a water tank of the invention as shown in FIG. 1 comprising a columnar body disposed therein.
Figures 3A, 3B:
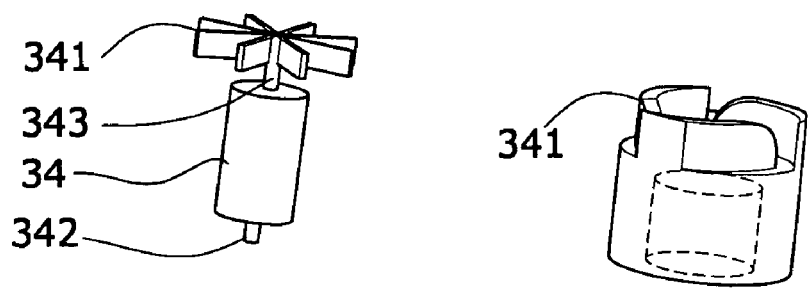
FIGS. 3A and 3B are three-dimensional rear perspective views showing an apparatus for the diversion of water flow with a rotary axle of a magnetic impeller or a magnetic rotor.
Figure 10:
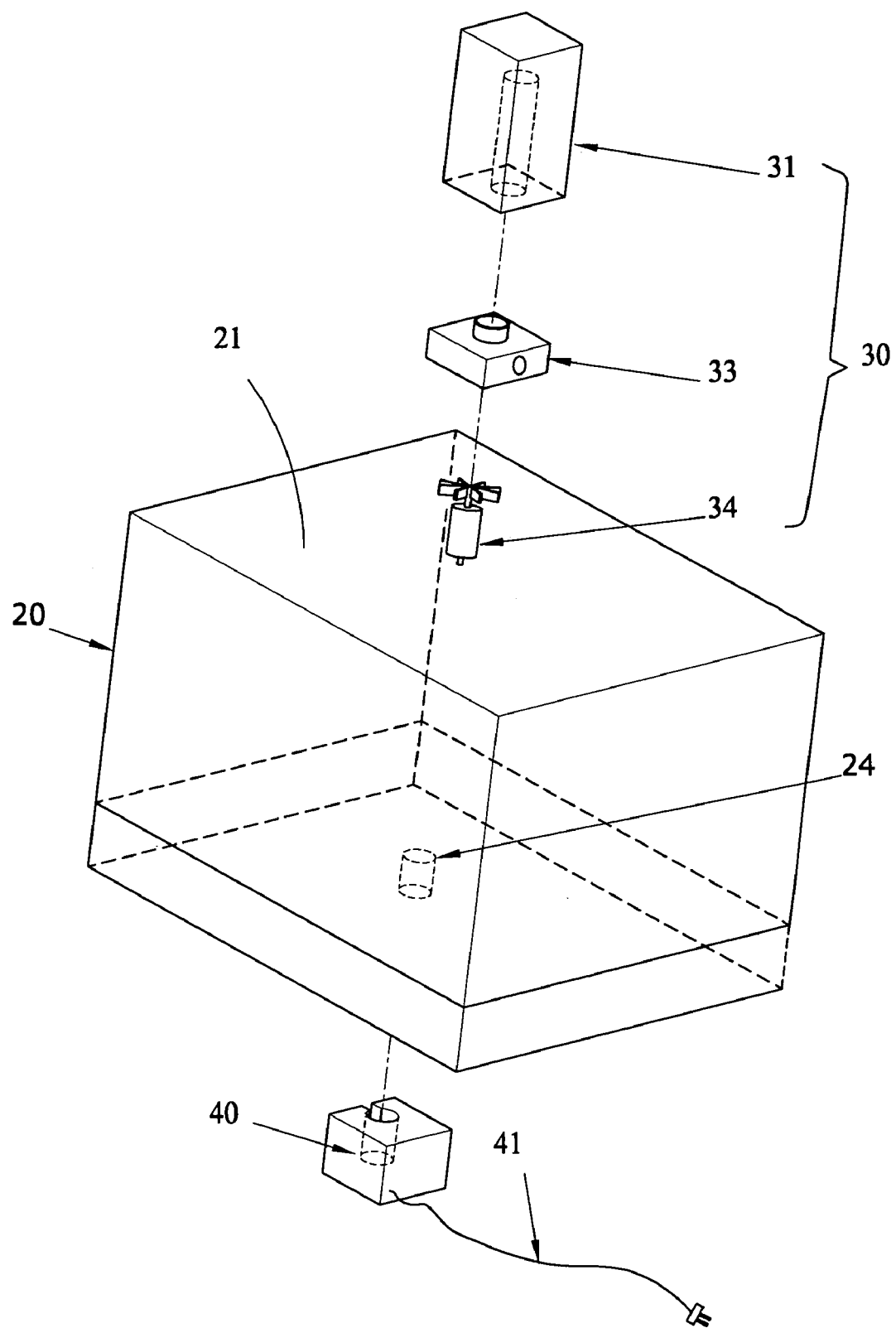
FIGS. 10-14 are three-dimensional rear perspective views showing various embodiments of the aquarium of the invention.
Figure 13:
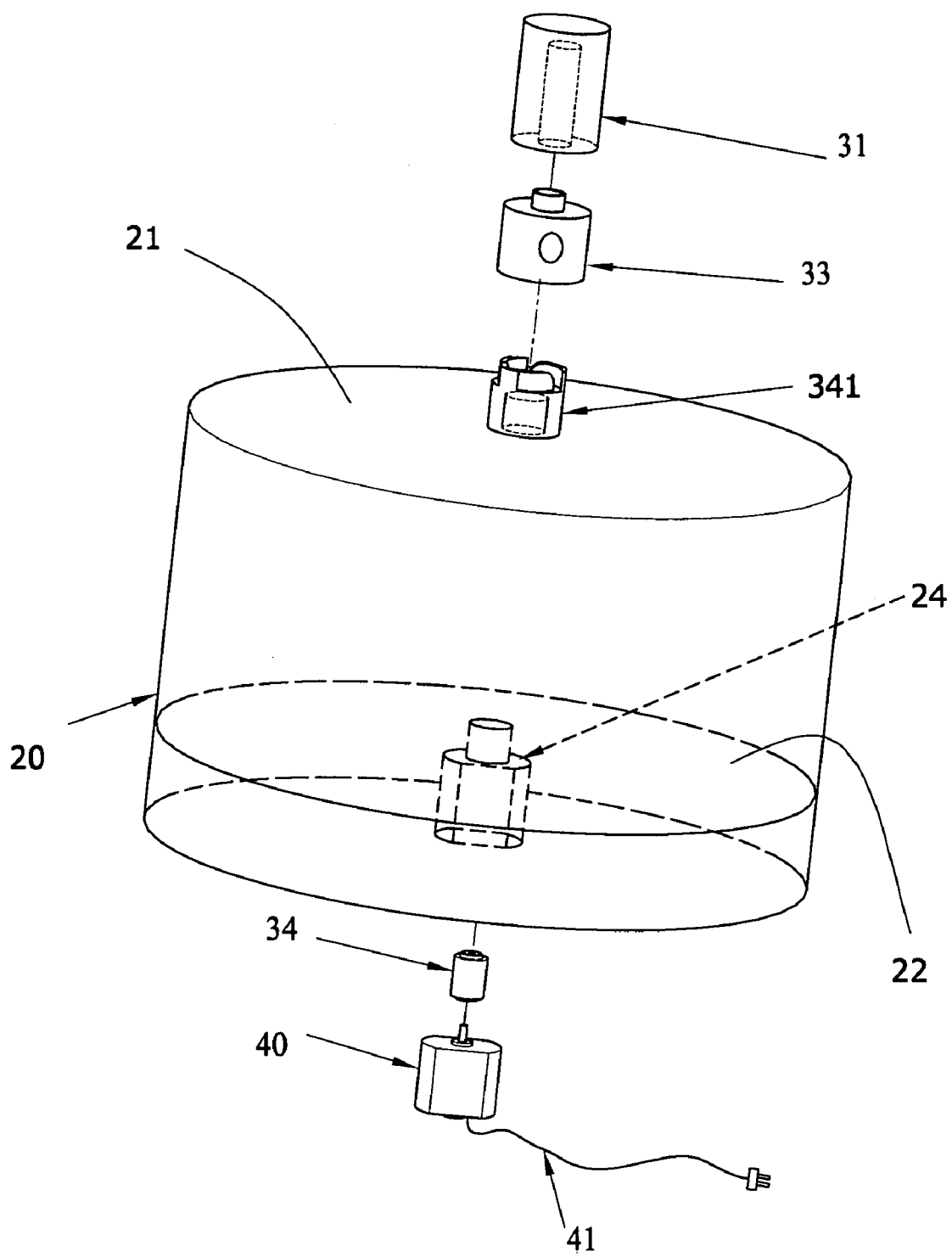

With reference to FIGS. 1, 2, and 3A, the container of said water tank 20 can be made in a rectangular or any other cubic form; the container in this preferred embodiment is of a rectangular form. The water tank 20 has a member disposed on the floor of the container 21, and which defines a recess. The member may have a columnar body 24 in any form or shape arranged in the container 21. The columnar body may be extended upwards inside the container 21 (or extended downwards outside the container 21) from the bottom 22 thereof. The preferred embodiment shows that the columnar body 24 is able to extend upwards inside the container 21 of the water tank 20 from the location of a sidewall 23 near the bottom 22 or near the center of the container (or extended downwards outside the container 21 as shown in FIGS. 10 and 13). Moreover, the preferred embodiment shows the best practice of locating the columnar body 24 at a corner below the water tank 20 in the shape of a rectangle.

The columnar body 24 has an installed surface 241 horizontally arranged on the top thereof for the installation of the filter 30. The installed surface 241 has a round spindle hole 242 with a cross-section vertically and downwardly disposed; the spindle hole 242 has the underside on the center thereof set a locating slot 243 (as shown in FIG. 4).

The water tank 20 has the underside 221 on the bottom 22 thereof set a containing slot 244 vertically and upwardly extending inside the columnar body 24 and surrounding the spindle hole 242; the containing slot 244 can be vertically set from the location on the surface of the sidewall 23 near the bottom 22 of the water tank inwardly or outwardly.

Figure 4:
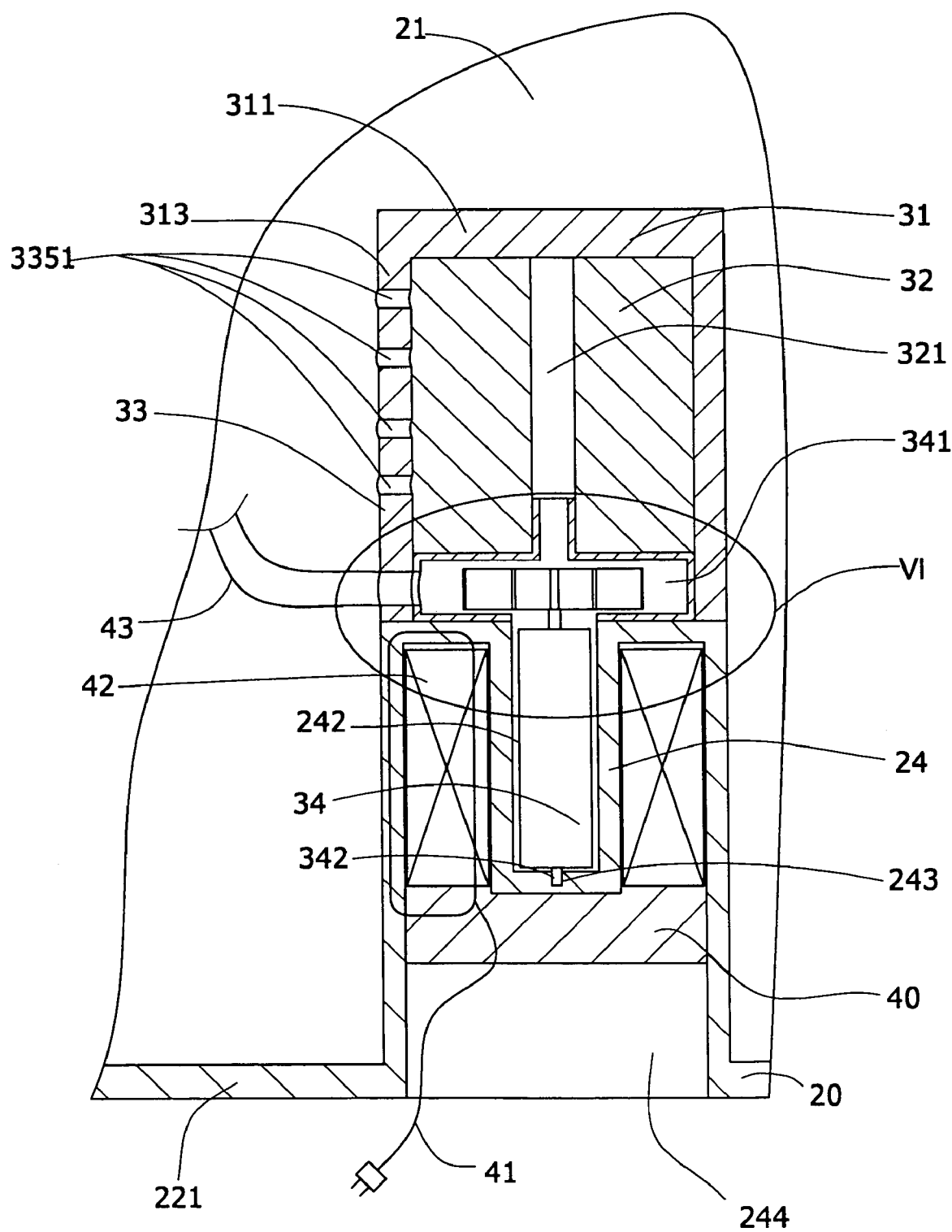
FIG. 4 is a cross-sectional perspective view showing the assembly of a filter and a driving mechanism as shown in FIG. 1.
Figure 5:
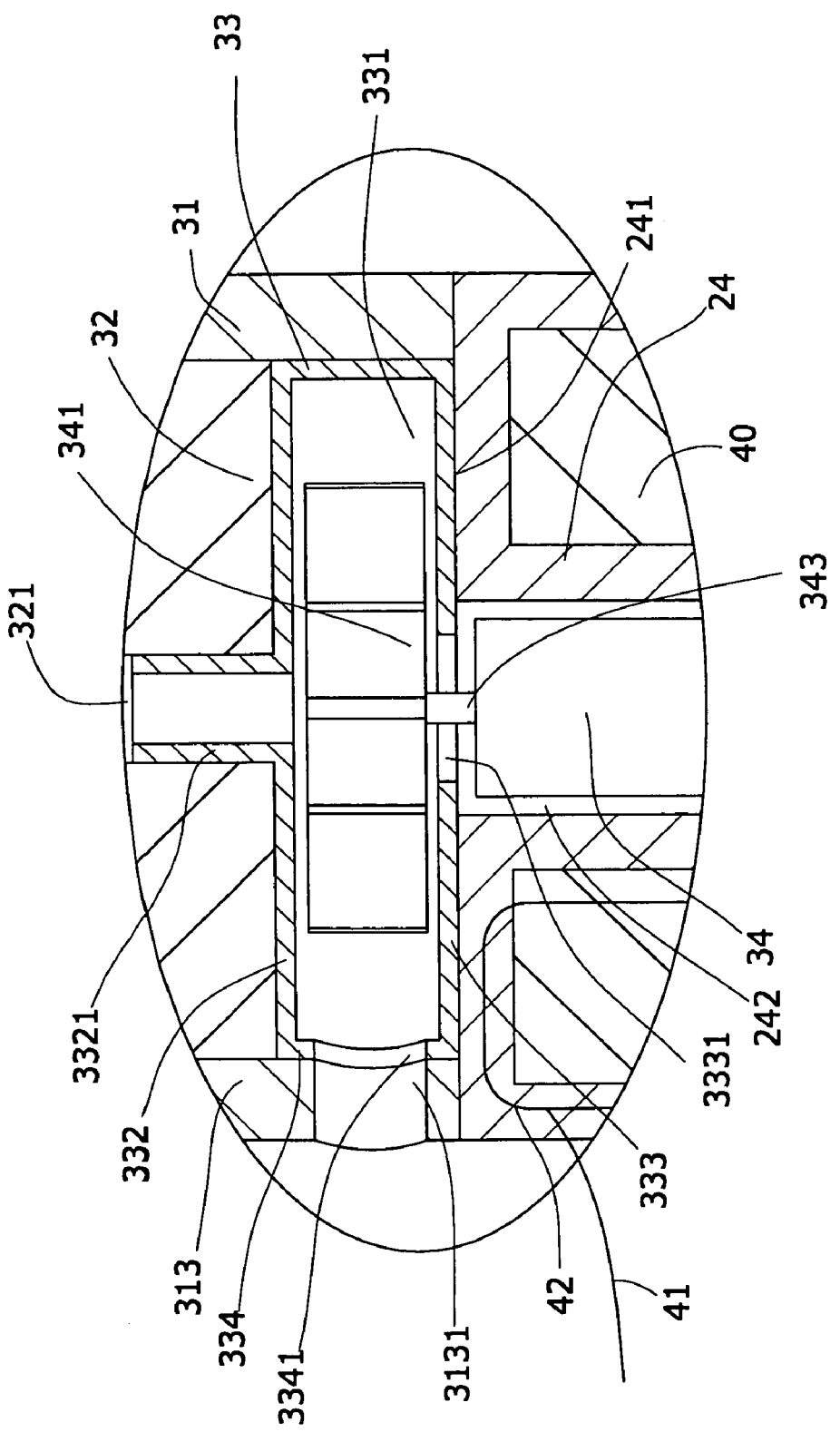
FIG. 5 is an enlargement showing VI drawing in FIG. 4.
Figure 6:
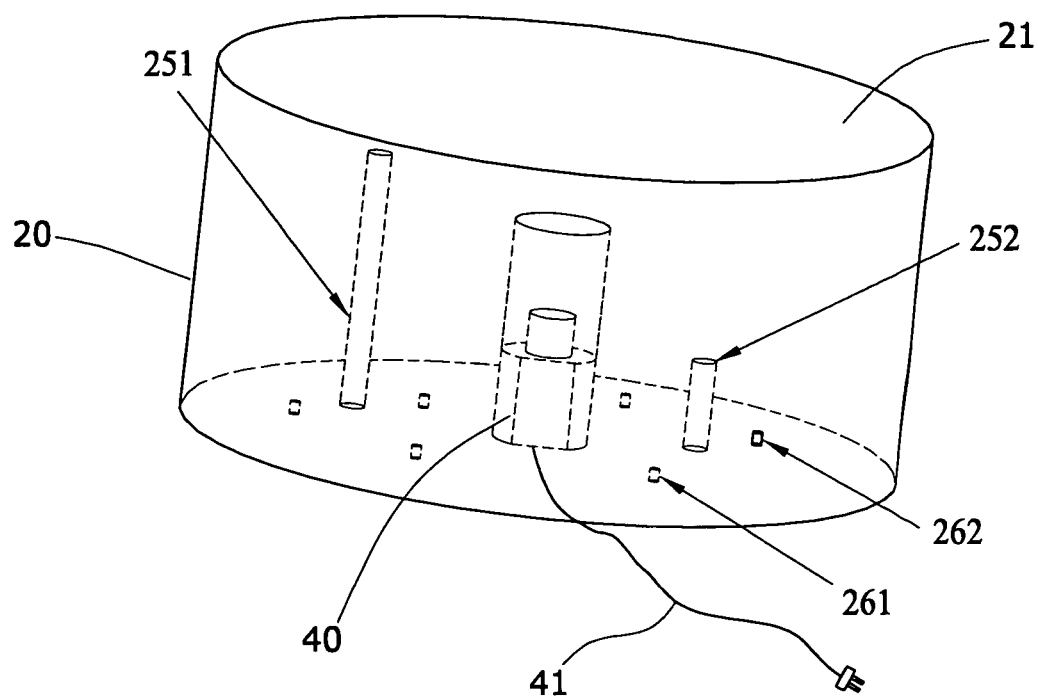
FIG. 6 is a three-dimensional perspective view showing the complete assembly of the aquarium of FIG. 1.
Figure 7:
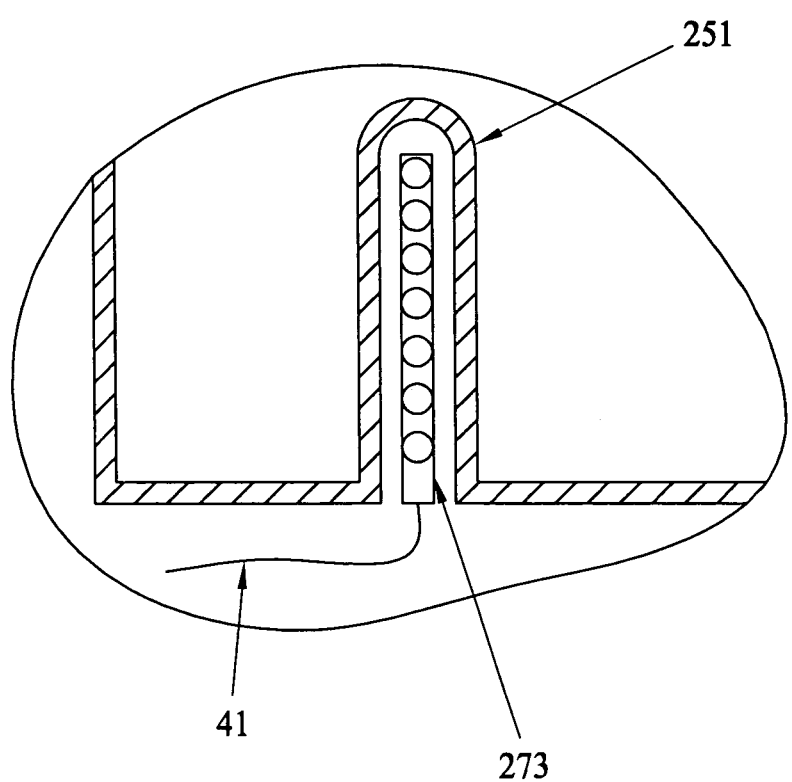
FIGS. 7-9 are other partial perspective views showing a water tank comprising a lighting component, a heater, and ornaments.
Figure 8:
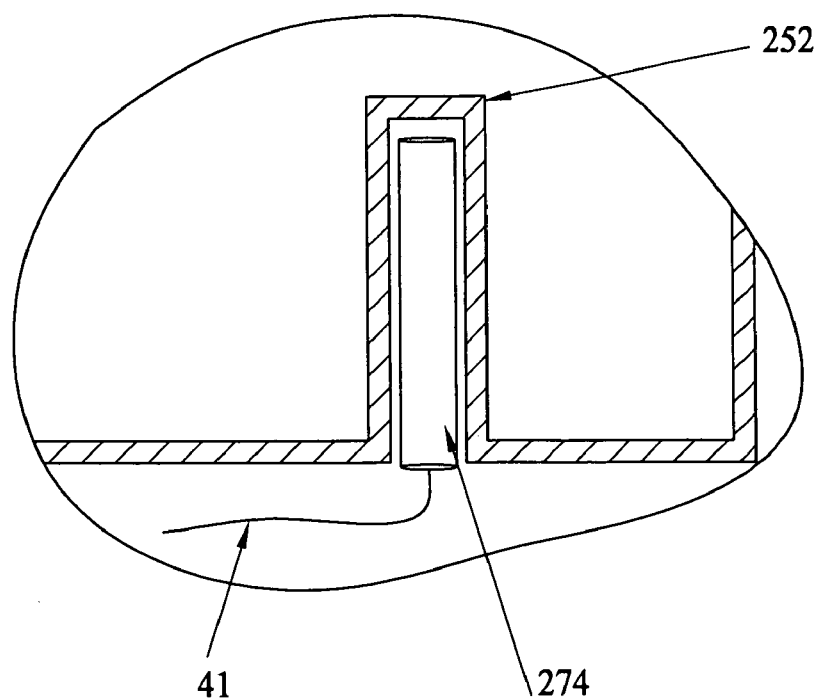
Figure 9:
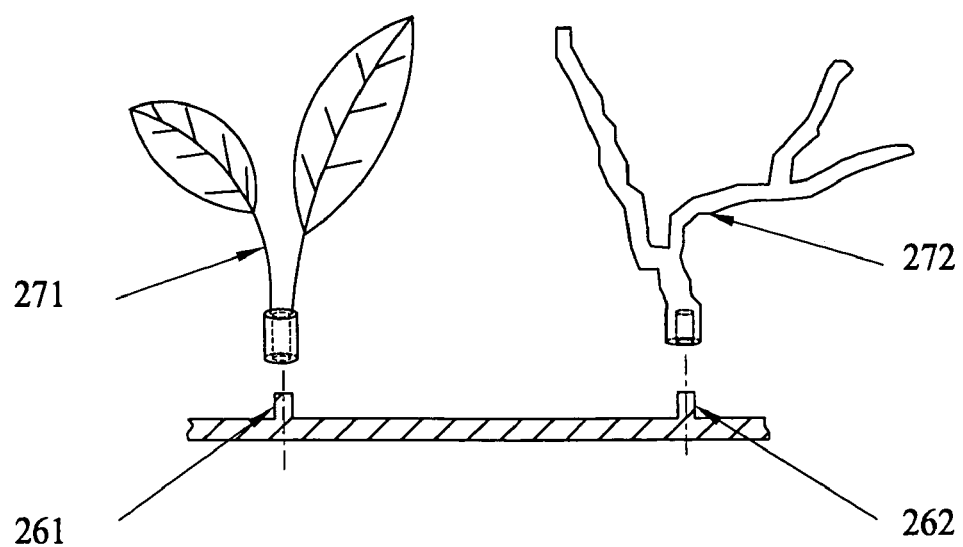

With reference to FIGS. 1, 4, and 5, the preferred embodiment shows that the driving mechanism 40 is made of silicon steel with a coil 42 winding around (or a magnetic device for transforming the magnetic pole); the coil 42 and the conducting wire 41 are connected together. The containing slot 244 is disposed outside the container 21 of the water tank 20, so that the conducting wire 41 of the coil 42 is not necessarily placed inside the container 21 of the water tank 20, but a place not easily accessible to people, in order to avoid the danger of electric leakage of the conducting wire 41; meanwhile, the conducting wire 41 is placed outside the container 21 of the water tank 20, providing the necessary power supply for other electric related components.

With reference to FIGS. 1 to 6, the preferred embodiment shows that the filter 30 comprises a casing 31 in the shape of a rectangle containing a filter material 32 inside thereof and is set upright on the installed surface 241; a diverter 33 is disposed on the bottom of the casing 31 and envelops the filter material 32 inside the casing 31, and a rotary axle 34 possesses an impeller 341. The casing 31 has an opening 3351 set on the sidewall 313 thereof piercing through the container 21 of the water tank 20, enabling water to flow into the container 21 of the water tank 20. The filter material 32 has a channel 321 vertically passing through the center thereof. The diverter 33 is in the shape of a rectangle; a diversion room 331 has a diversion nozzle 3321 set on the center of a top wall 332 thereof in the sleeve shape extending upwards; the diversion room 331 has a through-hole 3331 set on the center of a bottom wall 333 thereof. The sidewall 313 of the casing 31 and the sidewall 334 of the diverter 33 have water discharges 3131 and 3341 horizontally arranged thereon or can connect an apparatus for the diversion of water discharge 43. The rotary axle 34 is a magnetic movable member contained in the spindle hole 242. A locating shaft 342 extends downwards from the center of the surface of the lower end thereof and is contained in such a way so as to allow it to rotate in the locating slot 243. A coupling column 343 extends upwards from the center of the surface of the upper end thereof. The coupling column 343 pierces through the through-hole 3331. The impeller 341 is horizontally fixed on the coupling column 343 and pierces through the end of the through-hole 3331, thereby enabling water in the diversion room 331 to flow out through the water discharges 3131 and 3341 via the rotation of the impeller or through the apparatus for the diversion of water discharge 43.

The rotary axle 34 is contained in the spindle hole 242, enabling the rotary axle 34 to be placed on the magnetic center of the silicon steel. When the coil 42 of the silicon steel passes through the conducting wire 41 which connects the external alternating current to generate alternating current magnetism and drive the rotary axle 34 to rotate, so as to drive the impeller 341 to rotate, thereby enabling water in the diversion room 331 to flow out through the water discharges 3131 and 3341 or through the apparatus for the diversion of water discharge 43.

With reference to FIGS. 1 to 6, the driving mechanism 40 is disposed in the containing slot 244 outside the container 21 of the water tank 20, the filter 30 is disposed on the installed surface 241 on the top of the columnar body 24 in the container 21 of the water tank 20. When the silicon steel is electrified through the coil of the conducting wire 41, an alternating current is generated to drive the rotary axle 34 to rotate, so as to drive the rotation of the impeller 341. Consequently, water in the container 21 of the water tank 20 flows into an opening 3351 of the casing 31, enters a channel 321 of the filter material 32 to process water filtration; purified water enters in the diversion room 331 through a diversion nozzle 3321 and then flows out through the water discharges 3131 and 3341 or through the apparatus for the diversion of water discharge 43; thus, the process of water filtration and circulation in the container 21 of the water tank 20 is completed.

The driving mechanism 40 and the filter 30 are respectively disposed outside and inside the container 21 of the water tank 20; therefore, the conducting wire 41 of the driving mechanism 40 is not necessarily placed in the container 21 of the water tank 30, but a place not easily accessible to people, so as to avoid the danger of electric leakage of the conducting wire 41; meanwhile, the conducting wire 41 is placed outside the container 21 of the water tank 20, providing power supply for other electric related components.

With reference to FIGS. 6 to 9, the water tank 20 has concave sections 251 and 252 set in the concave portion of the container 21 on the bottom thereof, or has convex sections 261 and 262 upwardly set on the bottom of the container 21; the concave sections 251 and 252 or the convex sections 261 and 262 are able to contain other components inside thereof. In this preferred embodiment, the concave sections 251 and 252 are used to fasten a lighting component 273 and a heater 274. The convex sections 261 and 262 respectively contain ornaments 271 and 272. Of course, the lighting component 273 and the heater 274 are able to be contained in the portion projecting outside the container. As the conducting wire 41 of the driving mechanism 40 is not necessarily placed in the container 21 of the water tank 20, the deployment of power conducting wires 41 for the ornaments 271 and 272, the lighting component 273, and the heater 274 enable an appealing appearance of the aquarium.

In addition, the water tank 20 has a permeable stratum disposed near the bottom 22 thereof. The permeable stratum has holes or grids arranged thereon and an interface for linking ornaments. The permeable stratum is preferably arranged between the water inlet of the diverter 33 and the water discharge of the apparatus for the diversion of water discharge 43.

As shown in FIG. 10, the water tank is in a rectangualar shape, contains a columnar body 24 with a magnetic rotary axle 34 inside thereof, extends outwardly from the bottom 22 of the water tank 20 near the center thereof to the container 21 of the water tank 20. The filter 30 is disposed in the container, while the driving mechanism 40 is disposed outside the container.

Figure 11:
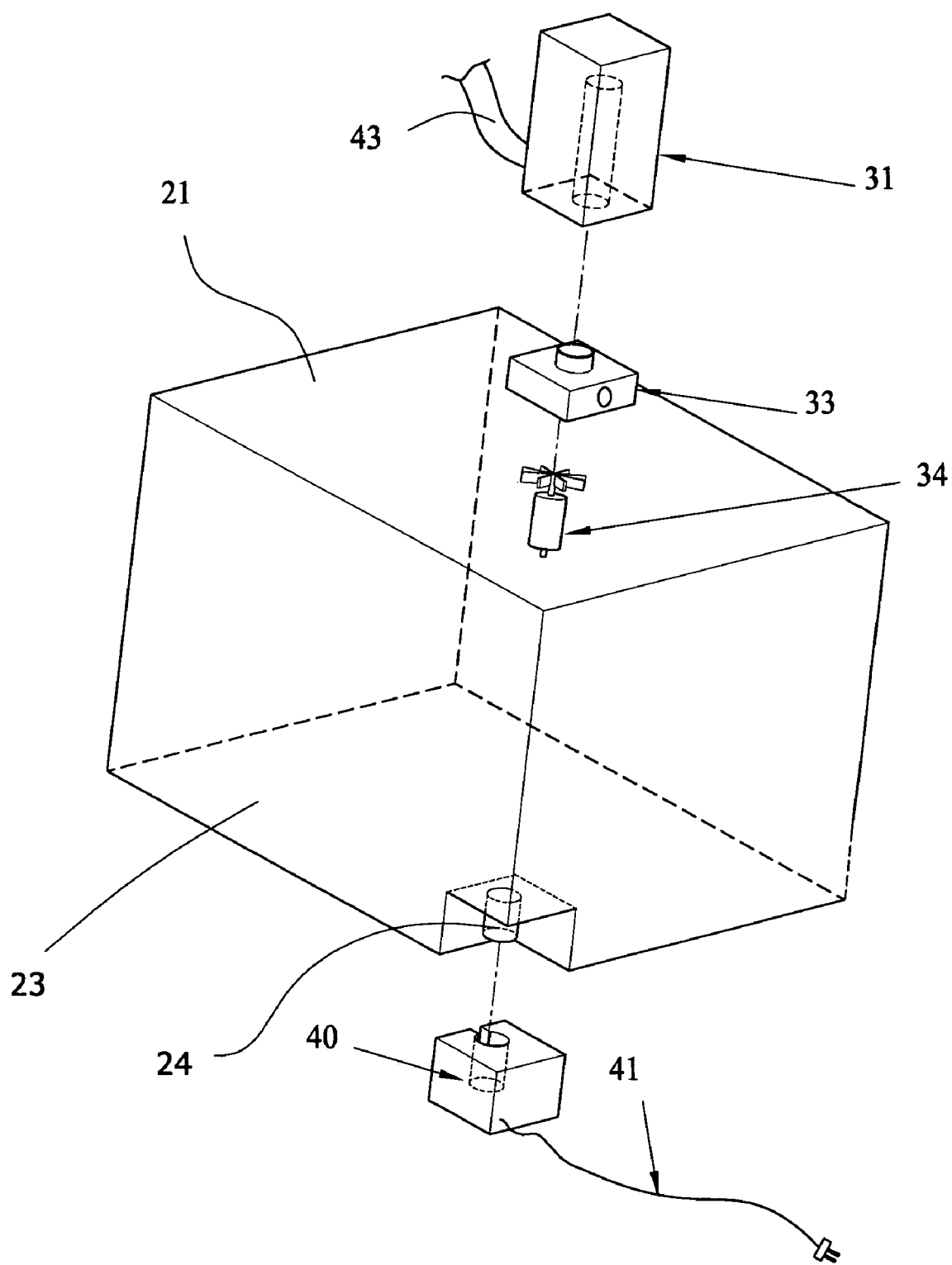

FIG. 11 shows that the water tank 10 is in a rectangular shape containing a columnar body 24 with a magnetic rotary axle 34 inside thereof and extending outwardly from the sidewall 23 downwardly to the container 21 of the water tank 20. The filter 30 is disposed in container 21, while the driving mechanism 40 is disposed outside the container 21. The sieve and the installed surface 241 of the columnar body 24 are placed vertically to each other.

Figure 12:
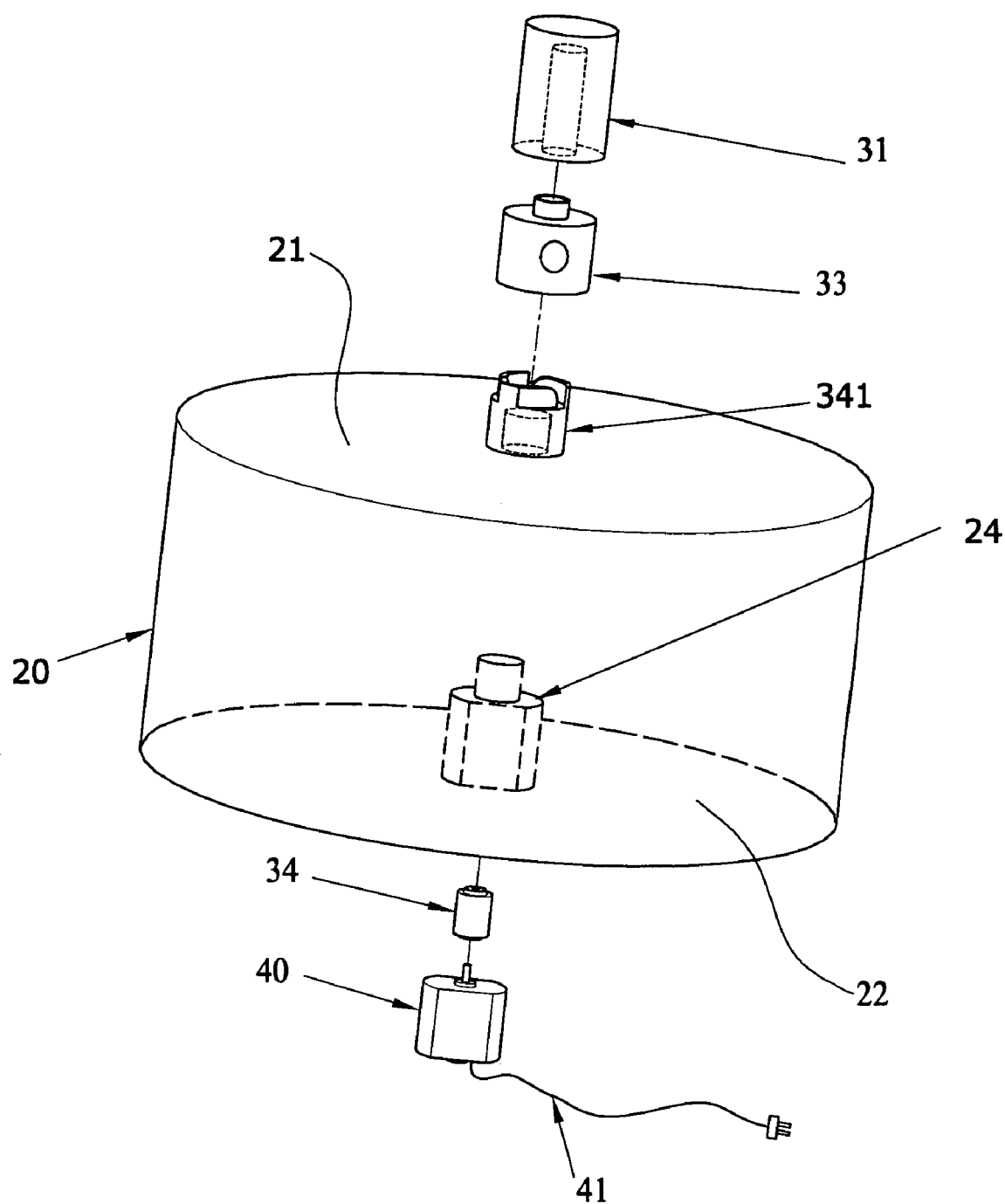

With reference to FIGS. 12 and 3B, the water tank is a round columnar body, containing the magnetic impeller 341. The magnetic rotary axle 34 is positioned on the top of the shaft of the driving mechanism 40 outside the container 21. The columnar body 24 extends upwardly from the bottom 22 of the water tank 20 near the center thereof to the container 21 of the water tank 20. With reference to FIGS. 13 and 3B, the columnar body 24 upwardly and inwardly extends from the bottom 22 of the water tank 20 near the center thereof to the container 21 of the water tank 20. The filter 30 is disposed in the container, while the driving mechanism 40 is disposed outside the container.

Figure 14:
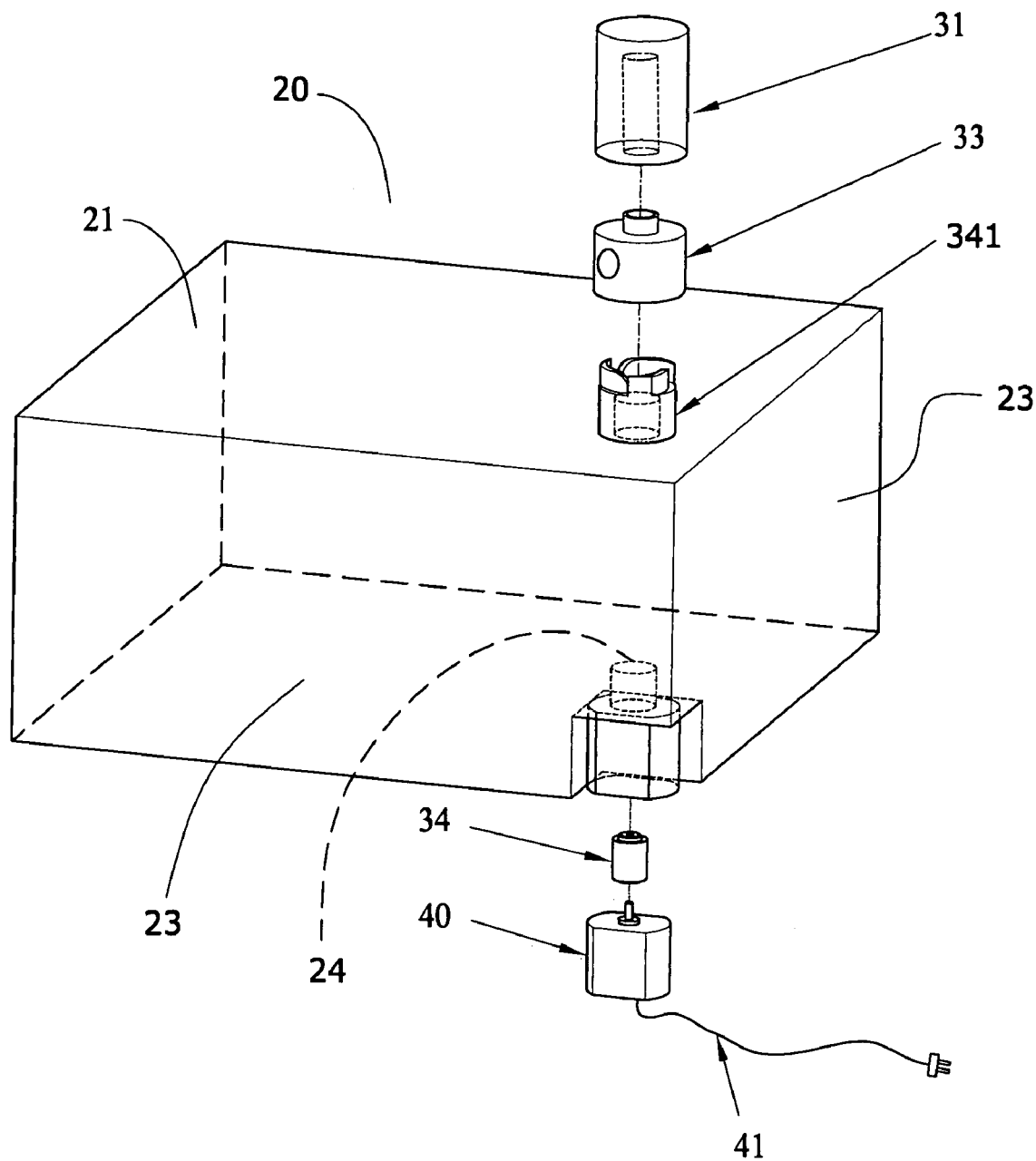

With reference to FIGS. 14 and 3, the water tank 10 is in a rectanglular shape containing the magnetic impeller 341; its columnar body 24 extends upwardly and inwardly extends from the sidewall 23 of the water tank 20 to the container 21 of the water tank 20. The filter 30 is disposed in container 21, while the driving mechanism 40 is disposed outside the container 21. The sieve and the installed surface 241 of the columnar body 24 are placed vertical to each other.

Figure 15:
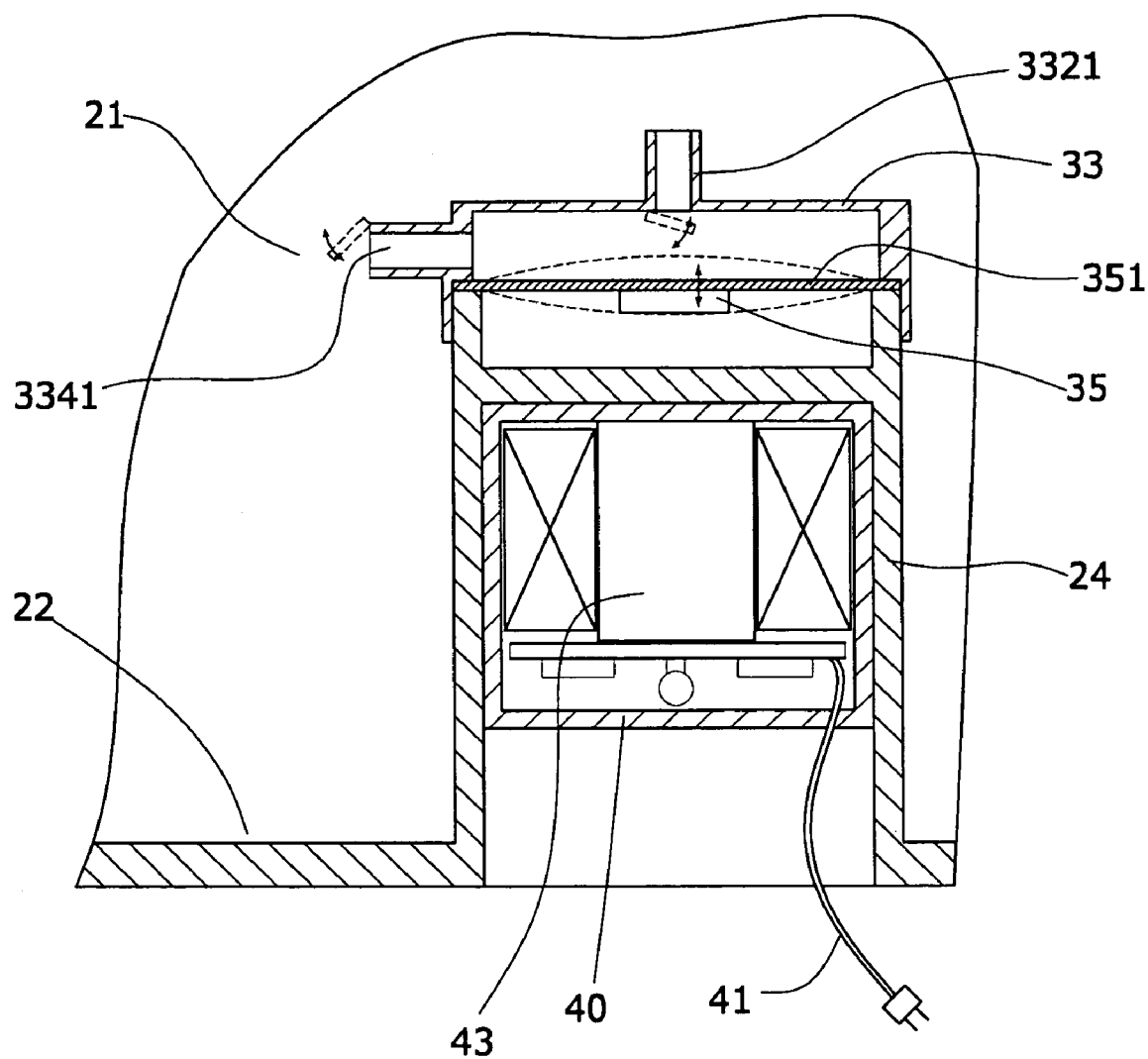
FIG. 15 is another cross-sectional perspective view showing the assembly of the driving mechanism of the invention.
Figure 16:
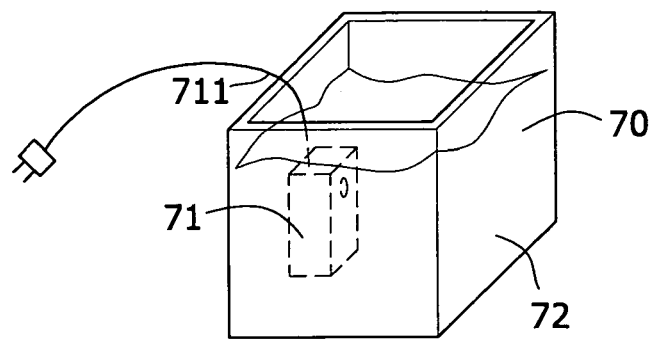
FIG. 16 is a three-dimensional perspective view showing another conventional aquarium.
Figure 17:
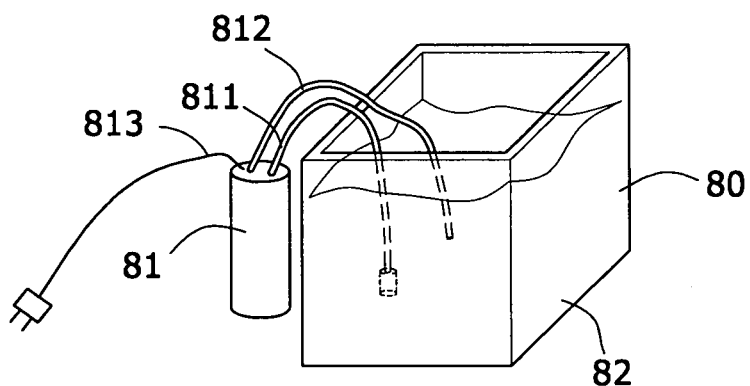
FIG. 17 is a three-dimensional perspective view showing yet another conventional aquarium.
Figure 18:
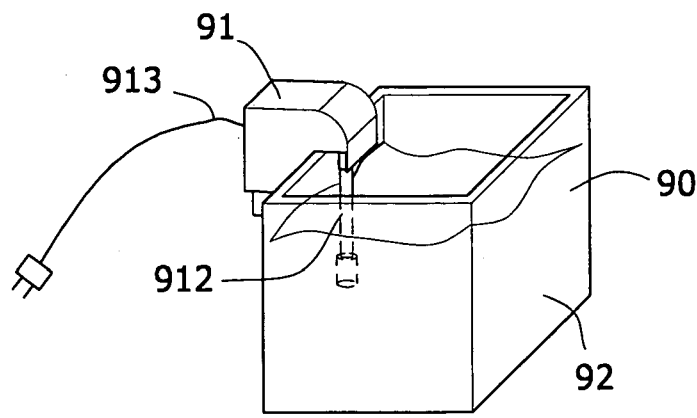
FIG. 18 is a three-dimensional perspective view showing one more conventional aquarium.

As shown in FIG. 15, the water tank 10 has a magnetic movable member comprising a magnetic slice 351 set between the diverter 33 and the installed surface 241, extending upwards from the bottom 22 to the top end in the container 21. The water inlet and the water discharge of the diverter 33 respectively possess retaining valves. The magnetic slice 351 possesses elasticity and a metal member 35 is set on the underside thereof. The container 21 has the driving mechanism 40 set outside thereof in a containing slot 244. The driving mechanism 40 is a device for transforming the magnetic pole, which is an electromagnet 44 with a coil encircling outside the magnetic core. The electromagnet 44 is driven to generate the intermittent magnetism through the control of the conducting wire 41 and a circuit board 45; in addition, the magnetic slice 351 is driven to move up and down due to the intermittent magnetism generated by the driving mechanism 40.

To sum up, the "aquarium" of the invention is able to achieve grinding efficiency and convenience, with the advantages of "practicability" and "advancement" in the field.

New characteristics and advantages of the invention covered by this document have been set forth in the foregoing description. It is to be expressly understood, however, that the drawings are for the purpose of illustration only and are not intended as a definition of the limits of the invention. Those who are skilled in the art may make changes in methods, shapes, structures, or devices in details without exceeding the scope of the invention. The scope of the invention is, of course, defined in the language in which the appended claims are expressed.

What is claimed is:

1. An aquarium, comprising:
a water tank having a water containing portion that has a floor, and a member disposed at the floor and that projects above the floor and into the water containing portion, the member defining a recess that is accessible from beneath the floor, the recess being disposed primarily above a plane defined by the floor, an interior of the recess being completely separated from an interior of the water containing portion, so that water contained in the water containing portion is precluded from reaching the interior of the recess; and a sieve comprising a filter disposed in the water containing portion and being supported by the member, and a driving mechanism supplying power to the filter and being fixed in the recess.

2. The aquarium of claim 1, wherein the filter is a magnetic movable member having a diverter disposed thereon; the diverter having a water inlet and a water discharge; the driving mechanism being a magnetic media for generating magnetism or transforming a magnetic pole.

3. The aquarium of claim 2, wherein the diverter has the water inlet or the water discharge thereof connected to one of the sieve and an apparatus for the diversion of water flow.

4. The aquarium of claim 2, wherein the water tank has a permeable stratum installed adjacent to the floor, the stratum having holes or grids arranged thereon and an interface for linking ornaments.

5. The aquarium of claim 4, wherein the permeable stratum is arranged between the water inlet and the water discharge of the diverter.

6. The aquarium of claim 1, wherein the member has a columnar body arranged on an upper surface thereof extended toward the interior of the recess; the columnar body having a magnetic movable member with a magnetic rotary axle disposed therein, the columnar body being enclosed by the driving mechanism; the driving mechanism being silicon steel with a coil winding around or a magnetic device for transforming a magnetic pole; the magnetic rotary axle being driven to rotate by the driving mechanism disposed outside the container.

7. The aquarium of claim 1, wherein the member has a columnar body arranged on an upper surface thereof extended into the water containing portion; the columnar body being enclosed by a magnetic movable member comprising a magnetic impeller; the columnar body having the driving mechanism arranged therein; the driving mechanism being an electric machinery having a rotary axle disposed on a top of a rotor thereof; the magnetic impeller being driven to rotate by the rotary axle.

8. The aquarium of claim 1, wherein the member has a magnetic movable member comprising a magnetic slice extended upwards from an upper surface thereof; the driving mechanism being a device for transforming a magnetic pole, the magnetic slice being driven to move up and down due to an intermittent magnetism generated by the driving mechanism.

9. The aquarium of claim 1, wherein the water containing portion has a hollow portion on a wall thereof extended inwards, enabling a lighting component or a heater to be installed therein.

10. The aquarium of claim 1, wherein the water containing portion has an interface arranged on a wall thereof for connecting a permeable stratum or ornaments.

* * * * *